US 6,635,148 B1

(12) United States Patent
Nishimura et al.

(10) Patent No.: US 6,635,148 B1
(45) Date of Patent: Oct. 21, 2003

(54) METHOD FOR REFINING EASILY POLYMERIZABLE MATTER-CONTAINED SUBSTANCE AND APPARATUS THEREFOR

(75) Inventors: Takeshi Nishimura, Himeji (JP); Yukihiro Matsumoto, Kobe (JP)

(73) Assignee: Nippon Shokubai, Osaka (JP)

( * ) Notice: Subject to any disclaimer, the term of this patent is extended or adjusted under 35 U.S.C. 154(b) by 0 days.

(21) Appl. No.: 09/537,621

(22) Filed: Mar. 29, 2000

(30) Foreign Application Priority Data

Apr. 5, 1999 (JP) .......................................... 11-097893

(51) Int. Cl.[7] .............................. B01D 1/06; B01D 3/04
(52) U.S. Cl. ...................... 202/153; 202/239; 202/269; 202/237; 202/189; 159/27.1; 159/27.4; 159/DIG. 42; 562/600
(58) Field of Search ................................ 202/188, 189, 202/242, 182, 237, 239, 269; 159/26.1, 27.1, 27.4, DIG. 42; 562/600; 203/8

(56) References Cited

U.S. PATENT DOCUMENTS

| 2,341,281 A | * | 2/1944 | McGovern ................... 202/160 |
| 3,717,553 A | | 2/1973 | Otsuki et al. |
| 3,784,450 A | * | 1/1974 | Van Hengel ............. 202/185.2 |
| 3,988,213 A | | 10/1976 | Yoshida et al. |
| 4,773,968 A | * | 9/1988 | O'Connell et al. ........... 203/26 |
| 5,897,749 A | | 4/1999 | Kroker et al. |
| 6,034,288 A | * | 3/2000 | Scott et al. ................... 570/102 |
| 6,348,135 B1 | * | 2/2002 | Nakahara et al. ............. 203/49 |

FOREIGN PATENT DOCUMENTS

| EP | WO 87-04084 | 7/1987 | ............ B01D/3/04 |
| GB | 787688 | 12/1957 | |
| GB | 866421 | 4/1961 | |
| GB | 1030214 | 5/1966 | |

OTHER PUBLICATIONS

The pacific Energy Center—"Food Processing Evaporator Systems"Apr. 23, 1998, pp. 1–3.*
Official communication from the European Patent Office enclosing a copy of a third–party's observations, which was submitted by Strehl Schubel–Hopf & Partner, dated Dec. 19, 2001.

* cited by examiner

Primary Examiner—Virginia Manoharan
(74) Attorney, Agent, or Firm—Mathews, Collins, Shepherd & McKay, P.A.

(57) ABSTRACT

A method for refining an easily polymerizable matter while preventing an easily polymerizable matter-containing substance from being polymerized and an apparatus for use in the method are disclosed. The method and apparatus for refining and separating the easily polymerizable matter-containing substance by the use of a distillation column provided with a heat exchanger set the linear velocity of a vapor in a connecting line intervening between the distillation column and the heat exchanger at a level of not less than 5 m per second and the retention time of the vapor at a level of not more than 3 seconds.

2 Claims, 6 Drawing Sheets

METHOD FOR REFINING EASILY POLYMERIZABLE MATTER-CONTAINED SUBSTANCE AND APPARATUS THEREFOR

BACKGROUND OF THE INVENTION

1. Field of the Invention

This invention relates to a method for refining an easily polymerizable matter-containing substance and an apparatus therefor. More particularly, it relates to a method for refining (meth)acrylic acid and/or a (meth)acrylic ester while preventing the acid and/or the ester from being polymerized particularly in the vapor phase and an apparatus to be used therefor.

2. Description of the Related Art

Such an easily polymerizable matter as impurities-containing (meth)acrylic acid has been heretofore refined as follows.

In a distillation column with a condenser and a re-boiler, the condenser is connected to the top of the distillation column via a (inter)connecting line and the re-boiler is positioned near the lower part of the distillation column via a (inter)connecting line. Here, the feed material such as the impurities-containing (meth)acrylic acid is supplied to the distillation column and distilled therein. The vapor distilled from (meth)acrylic acid which has entered the condenser via the connecting line is condensed and apart thereof is returned to the distillation column and the rest thereof is recovered as distillate D or subjected further to a subsequent treatment. Meanwhile, the liquid containing (meth)acrylic acid through the bottom of the distillation column is supplied to the re-boiler and reboiled therein, with the result that the vapor containing (meth)acrylic acid will be returned via the connecting line to the distillation column.

It is well known that (meth)acrylic acid and/or a (meth)acrylic ester is so easily polymerized very often during the process of production such as refinement and that the apparatus of production compellingly stopped. As a measure, the practice of adding a polymerization inhibitor such as hydroquinone or phenothiazine during the production of (meth)acrylic acid and/or (meth)acrylic ester thereby preventing polymerization in the liquid phase of the purification process has found popular recognition.

U.S. Pat. No. 3,988,213 discloses a method for preventing the vapor of a vinyl compound from condensing or polymerizing by providing a distillation column with a jacket.

Further, U.S. Pat. No. 3,717,553 discloses a distillation column which, by having an opening formed near the wall of a tray tower and consequently allowed to have the wall of its own wetted, is enabled to prevent a vinyl monomer from polymerizing.

Perfect prevention of the polymerization that occurs during the distillation of an easily polymerizable matter or during the condensation of a vapor or the re-condensation of the vapor in a vapor phase has not yet been accomplished.

SUMMARY OF THE INVENTION

An object of the invention is to provide a method for refining an easily polymerizable matter-containing substance such as (meth)acrylic acid and/or a (meth)acrylic ester, which attains the refinement efficiently by efficiently preventing the matter under treatment from polymerizing in a vapor phase part of a connecting line interposed between a distillation column and a heat exchanger, and an apparatus to be used therefor.

The present inventors have pursued a study and consequently found that in the distillation of (meth)acrylic acid and/or a (meth)acrylic ester, the compound being distilled is prevented from polymerizing by causing a vertical shell-and-tube heat exchanger to be supported by the distillation column and by branching a vapor line interconnecting them from the direct shell part of the distillation column or setting a condenser directly on the top of the distillation column or setting a re-boiler in the bottom of the distillation thereby decreasing the vapor phase volume thereof. This invention has been achieved as a result.

Specifically, according to the first aspect of this invention it can provide a method for refining and separating an easily polymerizable matter-containing substance by using a distillation column furnished with a heat exchanger, which method is characterized by setting the linear velocity of the vapor in a connecting line interconnecting the distillation column and the heat exchanger at a level of not less than 5 m per second and the retention time of the vapor in the connecting line at a level of not more than 3 seconds.

According to the second aspect of this invention, it can provide an apparatus for refining an easily polymerizable matter-containing substance by using a distillation column furnished with a heat exchanger, which apparatus is characterized by using a condenser as the heat exchanger and having the condenser directly set on the top of the distillation column.

Then, according to the third aspect of this invention, it can provide an apparatus for refining an easily polymerizable matter-containing substance by using a distillation column furnished with a heat exchanger, which apparatus is characterized by using a re-boiler as the heat exchanger and the re-boiler being disposed directly inside the distillation column in the lower part thereof wherein a vapor guide provided above the heating tubes for the re-boiler is opened into the vapor phase part of the column and a down-take is furnished outside the heating tubes.

As described above, this invention, in refining and separating an easily polymerizable matter-containing substance by using a distillation column furnished with a heat exchanger, is capable of effectively preventing the vapor of the easily polymerizable matter-containing substance from polymerizing by setting the linear velocity of the vapor in a (inter)connecting line interconnecting the distillation column and the heat exchanger at a level of not less than 5 m per second and the retention time of the vapor in the connecting line at a level of not more than 3 seconds.

Further, by using the apparatus of this invention for refining an easily polymerizable matter-containing substance, the vapor of the easily polymerizable matter-containing substance can be effectively prevented from polymerizing.

The above and other objects, features, and advantages of the present invention will become clear from the following description of the preferred embodiment.

DESCRIPTION OF THE PREFERRED EMBODIMENTS

The easily polymerizable matter for use in this invention has no particular restriction but is only required to be a matter which easily polymerizes. Polymerizable vinyl compounds may be cited as examples. The term "polymerizing vinyl compounds" as used herein may include (meth) acrolein; (meth)acrylic acid; hydroxyethyl(meth)acrylate, hydroxypropyl(meth)acrylate, glycidyl(meth)acrylate, methyl(meth)acrylate, and butyl(meth)acrylate, ethyl(meth) acrylate, 2-ethylhexyl(meth)acrylate, N,N-dimethyl amino ethyl(meth)acrylate, and mixtures thereof.

The term "easily polymerizable matter-containing substance" as used in this invention refers to a mixture, preferably a mixed solution, which comprises the easily polymerizable matter mentioned above and a by-product produced during the synthesis or formation of the easily polymerizable matter. In the case of acrylic acid or an acrylic ester, for example, this term refers to a solution of acrylic acid and an acrylic ester which contains by-products such as acetic acid, propionic acid, acrolein, maleic acid, water, and formalin which arise when the acrylic acid is obtained by the reaction of catalytic gas phase oxidation (JP-A-09-227,445 refers, for example). Then, in the case of methacrylic acid and a methacrylic ester, for example, the term refers to a solution of methacrylic acid and a methacrylic ester which contains by-products such as methacrolein, acrylic acid, and acetic acid which occur when the methacrylic acid is obtained by the reaction of catalytic gas phase oxidation (JP-B-03-24,459 refers, for example).

The distillation column to be used in this invention is not particularly limited but capable of effecting distillation of the easily polymerizable matter-containing substance. Examples of the distillation column may include mono-stage towers and multi-stage towers or columns such as a packed tower, a plate tower (tray tower), a wetting wall tower, and a spray tower. Among other types of distillation column mentioned above, the plate tower (multi-stage tray column) proves particularly advantageous from the viewpoint of prevention of polymerization and tower efficiency. The conditions for the distillation are not particularly limited but are only required to fit the purpose of distilling the easily-polymerizable matter-containing substance. Properly, the column top temperature may be in the range of above 40° C. from the view point of using a cooling water at the top of the column, on the other hand, may be in the range of below 100° C. from the view point of handling the easily polymerizable matter. The column bottom temperature may be in the range of below 150° C., preferably 60 to 100° C. from the viewpoint of polymerization of the easily polymerizable matter, thus according to the above, temperatures the column pressure may be determined and the reflux ratio be in the range of 1.2 to 2.0 times based on the minimum reflux ratio.

The shell-and-tube heat exchanger contemplated by this invention is used for the purpose of cooling the vapor emanating from the top of the distillation column or generating the vapor from the bottoms thereof. An ordinary shell-and-tube heat exchanger can be used for this purpose in the present invention. The term "shell-and-tube heat exchanger" as used in this invention means a condenser and a re-boiler. Normally, the shell-and-tube heat exchanger has a construction such that a bundle of a multiplicity of slender heat transfer tubes of small wall thickness is disposed in a cylindrical shell and effects exchange of heat between the fluids contacting the inner and outer sides of the heat transfer tubes, each fluid is introduced from an inlet, respectively. Generally, it is provided with a baffle plate for the purpose of enabling the shell side fluid to flow most effectively relative to the heat transfer tubes, exalting the efficiency of heat transfer, and retaining the heat transfer tubes fast in position. The heat exchanger of the type that is a vertical posture and passes the process fluid inside the tubes proves particularly advantageous, among other types of heat exchangers, from the viewpoint of preventing polymerization. The operating conditions for the condenser correspond to those of the column. Also, the operating conditions for the re-boiler correspond to those of the column.

Properly, in this invention, the linear velocity of the vapor in the connecting line between the distillation column and the heat exchanger or the equivalent of connecting line is set at a level of not less than 5 m per second, preferably in the range of 5–60 m per second, and more especially in the range of 20–60 m per second, and at the same time the retention time of the vapor in the connecting line is set at a level of not more than 3 (excluding 0) seconds, preferably not more than 2 (excluding 0) seconds. The term "vapor" as used herein means an easily polymerizable matter as vapor, in other words an easily polymerizable matter is vaporized and the vapor may contain a gas such as nitrogen gas. The linear velocity of the vapor is measured in a condition that exists during the course of the stationary operation of the distillation column, excluding the initial and terminal step of the distillation. The linear velocity of the vapor refers, when the distillation column and the heat exchanger are interconnected with a connecting line, to the magnitude that exists between the inlet and the outlet of this connecting line. Naturally, the distance to the joint of the distillation column to the connecting line and the distance to the joint of the heat exchanger to the connecting line are decreased to the fullest possible extent on the condition that the disassemble of the joint is attained as needed by this invention. If the linear velocity of the vapor is less than 5 m per second, the adhesion of the easily polymerizable matter-containing substance to the wall of line will become visually discernible. Conversely, if the linear velocity of the vapor exceeds 60 m per second, the excess will be at a disadvantage in enlarging the pressure loss and suffering the rise of temperature to become prominent. If the retention time of the vapor exceeds 3 seconds, the excess will be at a disadvantage in suffering the adhesion of the easily polymerizable matter-containing substance to the wall of the pipes to become visually discernible.

The linear velocity contemplated by this invention is determined according to the following formula:

Linear velocity (m/s)=flow of the vapor (kg/s)/(vapor density (kg/m$^3$)×area of the connecting line (m$^2$)).

The retention time contemplated by this invention is determined according to the following formula:

Retention time=$G/(H \times I)$ wherein G stands for the inner volume of the connecting line (m$^3$), H for the linear velocity of the vapor in the connecting line (m/s), and I for the cross sectional area of the connecting line (m$^2$).

In this invention, the distance over which the vapor passes between the distillation column and the heat exchanger is preferred to be substantially 0. The expression "substantially 0" as used herein refers to disposing the heat exchanger on the distillation column, namely avoiding use of such other member or part as a (inter)connecting line between the distillation column and the heat exchanger. When the heat exchanger is serving as a condenser, this expression depicts the fact that this condenser is disposed directly on the top part of the distillation column. When the heat exchanger is serving as a re-boiler, the expression depicts the fact that the re-boiler is disposed directly in the lower part, preferably in the lowest part, of the straight shell of the distillation column.

The re-boiler that is disposed directly inside the column by means of flanges in the lower part thereof is composed of a cylindrical vessel provided on the lateral side thereof with an inlet and an outlet for a heating medium and tightly sealed in the upper and lower part thereof, a plurality of heat transfer tubes disposed between the upper and lower sides of the cylindrical vessel and provided respectively therein with a vertically piercing hole, a vapor guide disposed above the cylindrical vessel and having a vapor vent positioned approximately in the central part of the distillation column, a loose lid disposed on or above the vapor vent, and a down-take disposed in such a manner outside the heating tube as to join the upper and lower parts of the cylindrical vessel.

In addition, in order to heighten the effect of preventing polymerization as another method it is preferable that the inner diameter, against the flow direction of the vapor, of the connecting line, from the column to the tube sheet of the heat exchanger, to substantially coincide with that of the heat exchanger shell in the view point of good distribution of the vapor and preventing the channeling thereof. In this sentence, the term "substantially" means that the velocity of vapor based on the difference of the sectional areas does not affect the prevention of polymerization. Of course, in this case it is essential to fulfil the conditions of the linear velocity of the vapor and the retention time.

Now, this invention will be described below with reference to the drawings.

Figure 1:
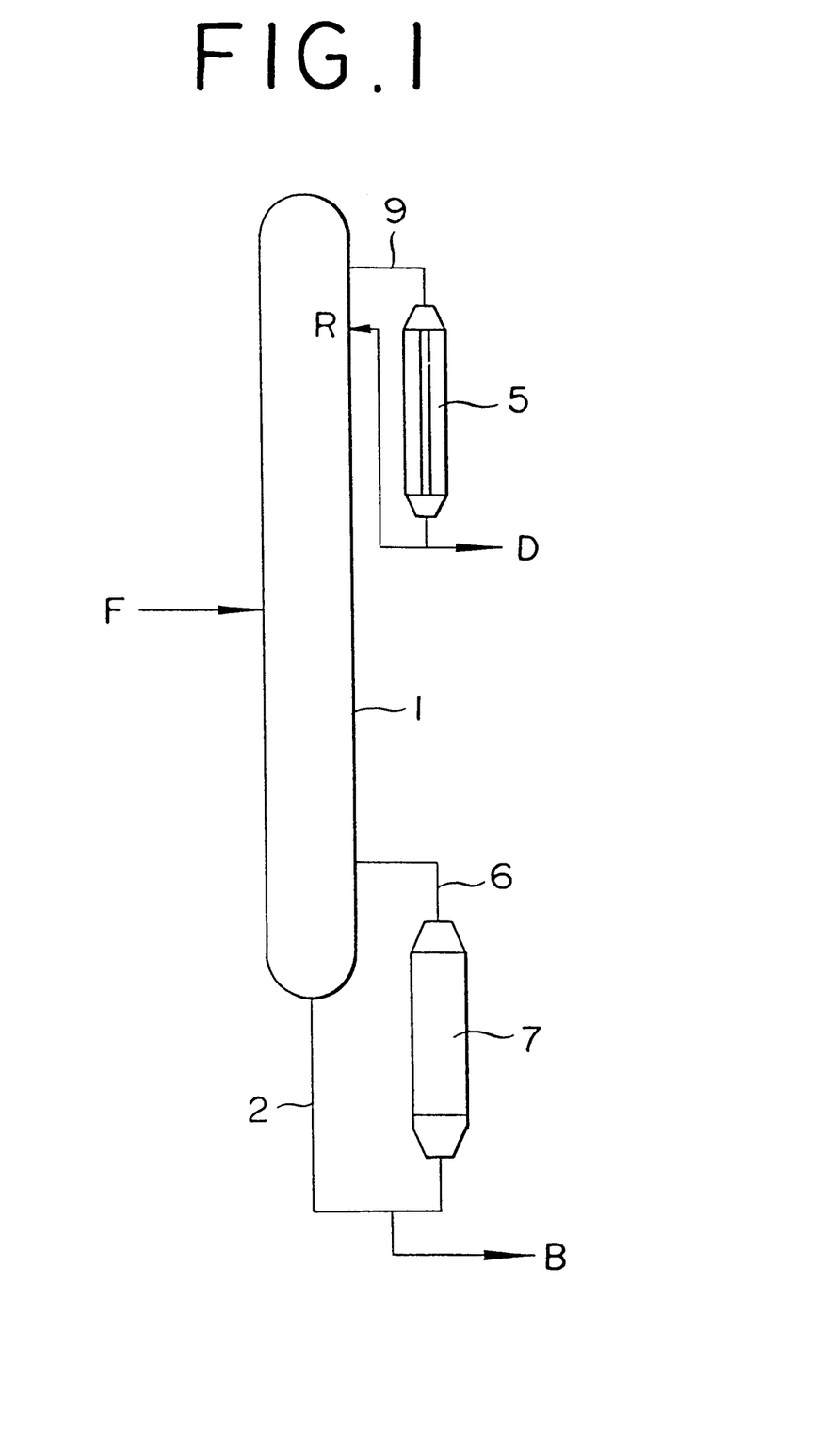
FIG. 1 is an explanatory diagram illustrating one example of the distillation column that is furnished with heat exchangers and used in this invention.

FIG. 1 is a front view of a distillation column equipped with a condenser and a re-boiler. The condenser is supported as connected to the upper part of the straight shell of the distillation column so as to decrease the vapor phase volume of the connecting line and shorten the retention time of the substance under treatment in the connecting line. The re-boiler is supported as connected to the lower part of the straight shell so as to decrease the vapor phase volume of the connecting line. Here, a vertical heat exchanger may be used as the condenser, a vertical heat exchanger as the re-boiler, and a plate tower as the distillation column as popularly accepted. With reference to FIG. 1, the vapor phase volume of a connecting line 9 is decreased to the fullest possible extent by minimizing the distance between the outlet of a distillation column 1 and the inlet of a condenser 5. For this purpose, the connecting line 9 to the condenser (shell-and-tube heat exchanger) 5 is drawn out of the straight shell near the top of the distillation column 1 and supported by the distillation column 1 (FIG. 1 omits illustrating a support for fastening the condenser to the distillation column). Though the connecting member or (inter)connecting line is not particularly limited on account of shape (such factors as radius of curvature, angle of bend, and angle of diversion), it is preferred to shorten the distance of connection with a view to heightening the effect of connection. To be specific, it is proper to connect the distillation column and the condenser with a 90° (miter)bend/elbow joint or a short pipe/reducer. The connection of the connecting line to the distillation column or to the condenser can be attained by any of the known methods such as, for example, welding or bolt-and-nut fastening through flanges. An easily polymerizable matter-containing substance F such as (meth)acrylic acid containing impurities is supplied to the distillation column 1 to effect distillation of (meth)acrylic acid therein. Since the length of the connecting line 9 from the top of the distillation column 1 to the condenser 5 is smaller than heretofore usual, the polymerization of the vapor of the easily polymerizable matter such as (meth)acrylic acid in the connecting line 9 can be decreased. It is naturally necessary that the linear velocity of the vapor in the connecting line 9 be not less than 5 m per second and the retention time of the vapor therein be not more than 3 seconds. The liquid as of the (meth)acrylic acid which has been indirectly cooled with a known coolant such as water or a cooling liquid in the condenser 5 is handled as a reflux liquid R or a distillate D.

A re-boiler 7 is disposed in the lower lateral part of the distillation column 1 using a (inter)connecting line 6. The vapor phase volume of the connecting line 6 is decreased to the fullest possible extent by minimizing the distance between the outlet of the re-boiler 7 and the inlet of the distillation column 1. For this purpose, the outlet of the re-boiler 7 is connected to the straight shell near the bottom of the distillation column 1 (FIG. 1 omits illustrating a support for fastening the re-boiler to the distillation column). Though the connecting member or connecting line is not particularly limited on account of shape (such factors as radius of curvature, angle of bend, and angle of diversion), it is preferred to shorten the distance of connection with a view to heightening the effect of connection. To be specific, it is proper to connect the distillation column and the re-boiler with a 90° (miter)bend/elbow joint or a short pipe/reducer. The liquid of the easily polymerizable matter as (meth)acrylic acid which is in the bottom part of the distillation column 1 flows through the connecting line 2 and enters the re-boiler 7. The vapor from the liquid re-boiled in the re-boiler 7 passes through the connecting line 6 and enters the vapor phase part of the distillation column 1. In the connecting line 6, the polymerization of the vapor is prevented or allayed because the linear velocity of the vapor is not less than 5 m per second and the retention time thereof is not more than 3 seconds. Then, the bottom stream from the re-boiler 7 is discharged via the connecting line 2(B). The connection of the connecting line to the distillation column or to the re-boiler can be accomplished by any of the known methods such as welding or bolt-and-nut fastening through flanges. Generally, the distillation column mentioned above is supported by any of the known devices such as a structure (not shown).

Figure 2:
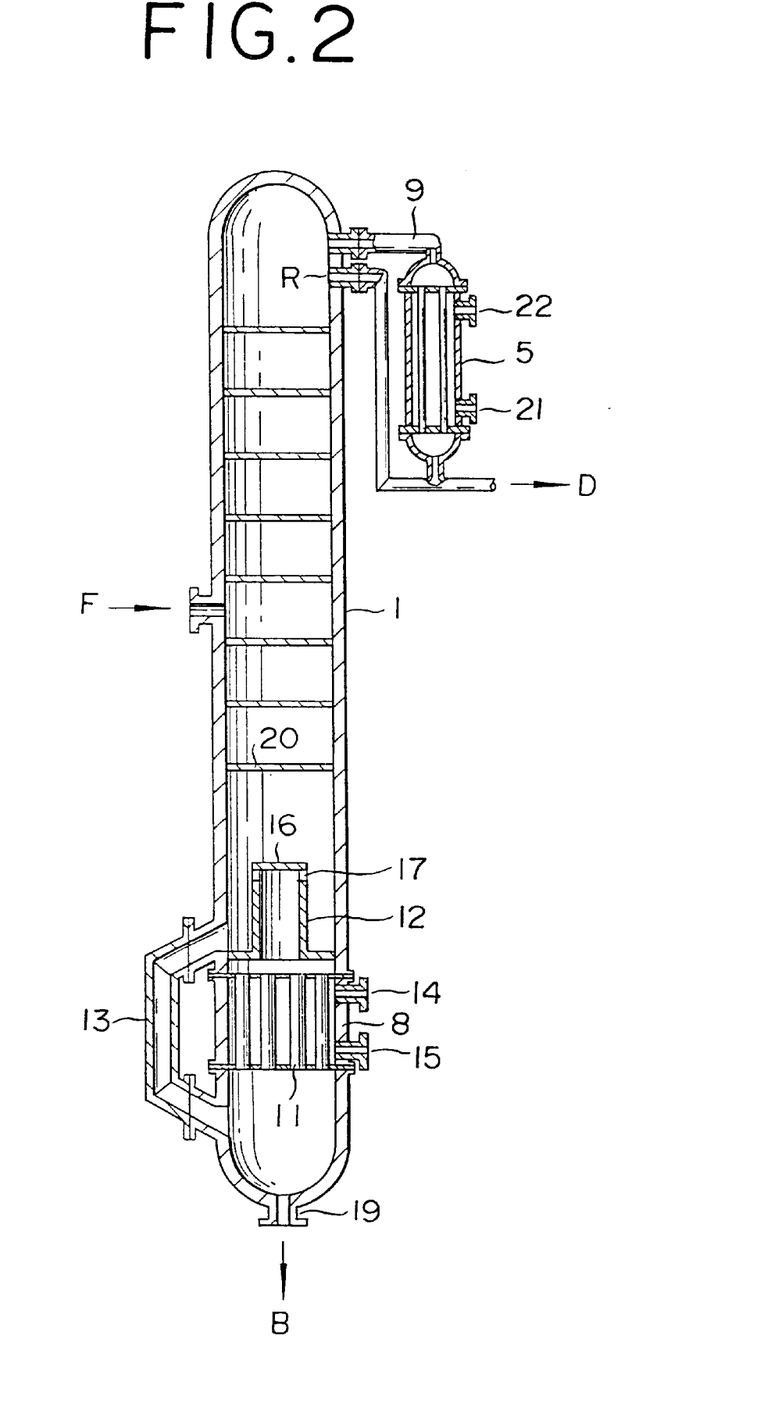
FIG. 2 is a sectional view illustrating one example of the distillation column in which a re-boiler is furnished inside the lower part thereof, a condenser furnished in the upper part thereof and used in this invention.

FIG. 2 is a sectional view illustrating a distillation column furnished with a condenser and a re-boiler, both condenser and re-boiler having a plurality of tubes therein. The condenser is supported as connected to the upper part of the straight shell of the distillation column to decrease the vapor phase volume of the connecting line and shorten the retention time of the matter under treatment, and a natural circulation type re-boiler is further disposed directly in the lower part of the straight shell of the distillation column. Here, the condenser and the distillation column are not particularly limited but allowed to use well-known devices such as a vertical heat exchanger and a plate tower. In the diagram, like members or parts found in FIG. 1 will be represented by like reference numerals. With reference to FIG. 2, the vapor phase volume of the connecting line 9 is decreased to the fullest possible extent by minimizing the distance from the outlet of the distillation column 1 to the inlet of the condenser 5. For this purpose, the connecting line 9 to the condenser (shell-and-tube heat exchanger) 5 is drawn out of the straight shell near the top of the distillation column 1 and supported by the distillation column 1 (FIG. 2 omits illustrating a support to be used for supporting the condenser to the distillation column). Though the connecting member is not particularly limited on account of shape (such factors as radius of curvature, angle of bend, and angle of diversion), it is preferred to shorten the distance of connection with a view to heightening the effect. To be specific, it is proper to connect the distillation column and the condenser with a 90° (miter)bend/elbow joint or a short pipe/reducer. The connection of the connecting line to the distillation column or to the condenser can be attained by any of known methods such as welding or bolt-and-but fastening through flanges. The easily polymerizable matter-containing substance F such as (meth)acrylic acid containing impurities is supplied to the distillation column 1 and subjected therein to distillation of (meth)acrylic acid. The polymerization of the vapor of the easily polymerizable matter such as (meth)acrylic acid in the connecting line 9 can be allayed because the length of the connecting line 9 from the top of the distillation column 1 to the condenser 5 is shorter than heretofore usual. Naturally, it is necessary that the linear velocity of the vapor in the connecting line 9 be not less than 5 m per second and the retention time thereof not more than 3 seconds. The liquid as of (meth)acrylic acid cooled indirectly with a known coolant such as water or cooling liquid in the condenser 5 is handled as a reflux liquid R or a distillate D.

The re-boiler is disposed directly in the lower part of the interior of the distillation column 1. When the distillation column is a plate column, it is fated to be positioned below the lowest stage in the plate column. The re-boiler mentioned above which is directly disposed in the lower part of the distillation column 1 is preferred to be composed of a cylindrical vessel 8 provided on the lateral side thereof with an inlet 14 and an outlet 15 for a heating medium and tightly sealed in the upper and lower parts thereof, a plurality of heat transfer tubes or heating tubes 11 disposed between the upper and lower sides of the cylindrical vessel 8 and provided respectively therein with a vertically piercing hole, a vapor guide 12 disposed above the cylindrical vessel 8 and having a vapor vent 17 opened into the vapor phase part of the distillation column, a loose lid 16 disposed on or above the vapor vent 17, and a down-take 13 disposed in such a manner outside the heating tube 11 as to join the upper and lower parts of the cylindrical vessel 8.

The easily polymerizable matter-containing substance F such as (meth)acrylic acid containing impurities is supplied to the distillation column 1 and subjected therein to distillation of (meth)acrylic acid. The liquid containing (meth) acrylic acid from the bottom of the distillation column 1 is supplied to the heating tube 11 of the re-boiler. Here, the liquid passes from the liquid surface positioned above the upper re-boiler tube sheet of the re-boiler through the down-take 13, ascends the interior of the heating tube 11 in a boiling state, and succumbs to natural circulation. By allowing the vapor guide 12 to open into the vapor phase part of the distillation column, it is possible not only to shorten the vaporization zone so as to relax the polymerization within the tube but also to increase the amount of the liquid to be circulated, shorten the retention time of the liquid, prevent partial rise of the temperature of (meth) acrylic acid, and preclude the polymerization of the polymerizable matter. The vapor formed by the boiling ascends, passes through the vapor guide 12, enters the distillation column 1, and succumbs to the ordinary treatment of distillation. The outlet of the heating tube 11 of the re-boiler generally constitutes itself the phase of a vapor-liquid mixture. By providing the loose lid 16 and the vapor guide 12, it is possible to prevent the liquid from the distillation column from directly entering the heating tube 11 and allay or abolish the resistance to the passage of the liquid hold-up on the upper surface of the heating tube 11 of the re-boiler. The heating for the boiling mentioned above is effected by introducing a heat medium such as steam through a heat medium inlet 14 and the heat medium spent in exchange of heat is discharged through an outlet 15. Then, the bottom stream is discharged through an outlet 19 (B). Since the re-boiler is disposed directly in the distillation column 1 and further since it is provided with the vapor guide 12 adapted to converge the vapor arising from the heating tube 11 of the re-boiler, the linear velocity of the vapor can be set at a level of not less than 5 m per second and the retention time of the vapor at a level of not more than 3 seconds and the polymerization of the vapor of the easily polymerizable matter such as (meth)acrylic acid between the re-boiler and the distillation column 1 can be allayed.

In addition, reference numeral 20 is a plate with a plurality of fine holes, reference numeral 21 an inlet of a coolant such as water, and reference numeral 22 an outlet thereof.

Figure 3:
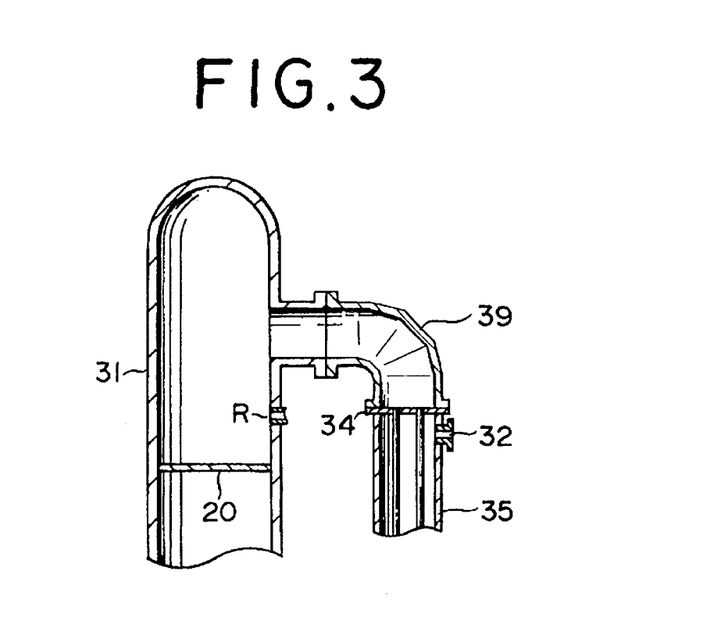
FIG. 3 is a fragmentary sectional view of another embodiment of parts of FIG. 2 showing a (inter)connecting line between the distillation column and the condenser.

FIG. 3 is a fragmentary sectional view of another embodiment of the connecting line between the distillation column and the condenser in FIG. 2. In FIG. 3, a (inter)connecting line 39 such as a miter bend is equipped between the distillation column 31 with the plate 20 and the condenser 35 with an outlet 32 of a coolant by means of bolt-and-nut fastening through flanges. The inner diameter of the connecting line 39 is substantially identical to that of shell of the condenser 35 from the column 31 to the tube sheet 34 of the condenser 35 in the view point of increasing good distribution of the vapor and preventing the channeling thereof.

Figure 4:
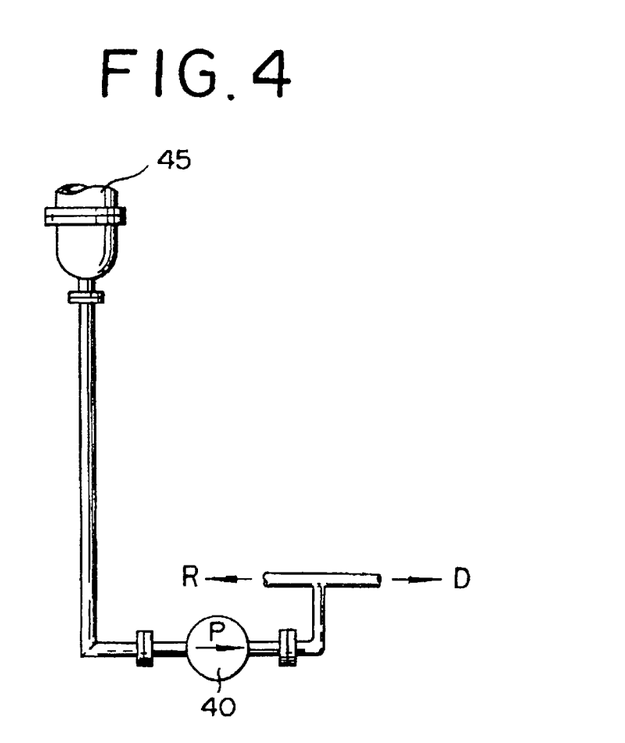
FIG. 4 is a fragmentary front view of another embodiment of parts of FIG. 2 showing a liquid line between the distillation column and the condenser.

FIG. 4 is a fragmentary front view of another embodiment of pipes between the condenser 45 and the R place of the distillation column in FIG. 2. In FIG. 4, a pump 40 is equipped between the pipe by means of bolt-and-nut fastening through flanges.

Figure 5:
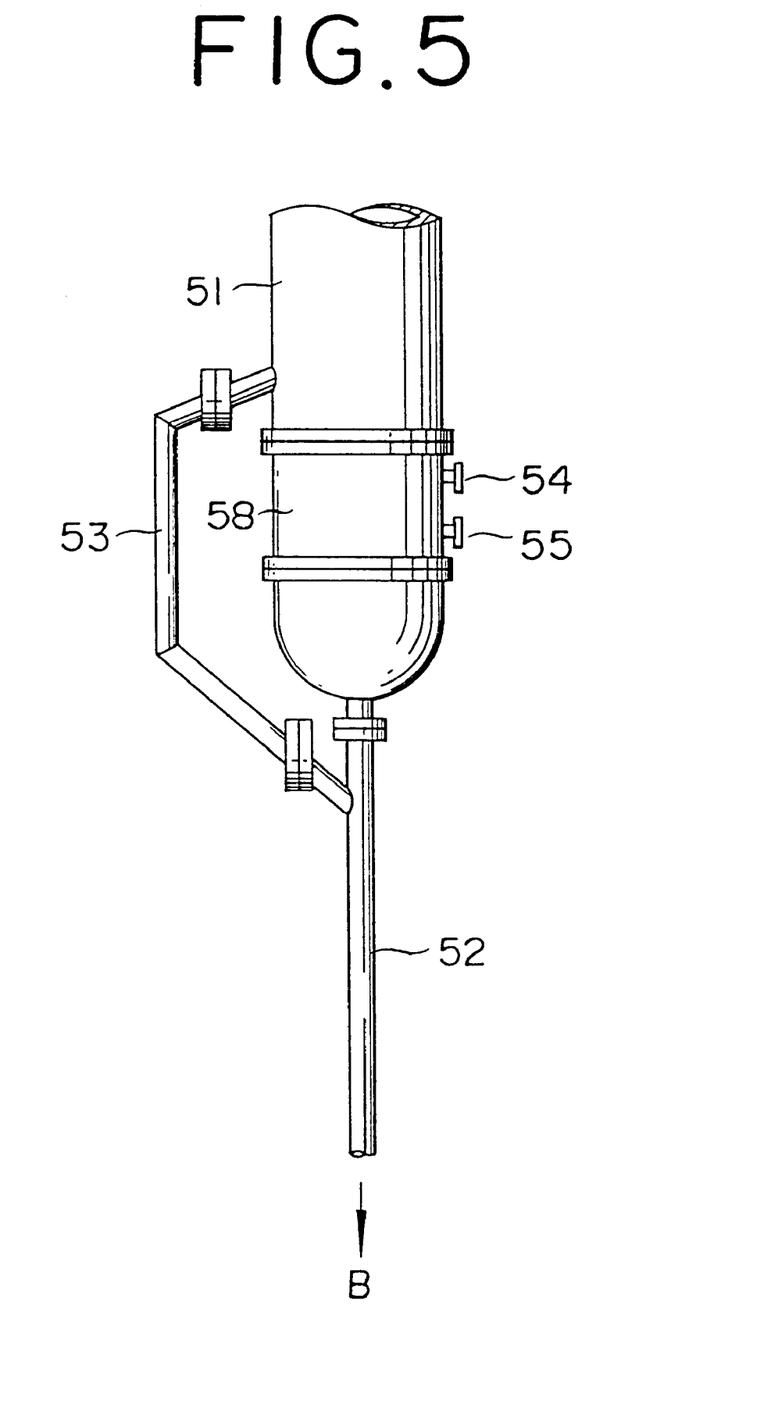
FIG. 5 is a fragmentary front view of another embodiment of parts of FIG. 2 showing a down-take.

FIG. 5 is a fragmentary front view of another embodiment of the down-take in FIG. 2. In FIG. 5, another embodiment of a down-take 53 is equipped between the distillation column with a re-boiler 58, which has an inlet 54 and outlet 55, of a heat medium, and the pipe 52 by means of bolt-and-nut fastening through flanges.

In the manner described above, the polymerization of the easily polymerizable matter-containing substance such as (meth)acrylic acid in the connecting line can be effectively prevented.

Figure 6:
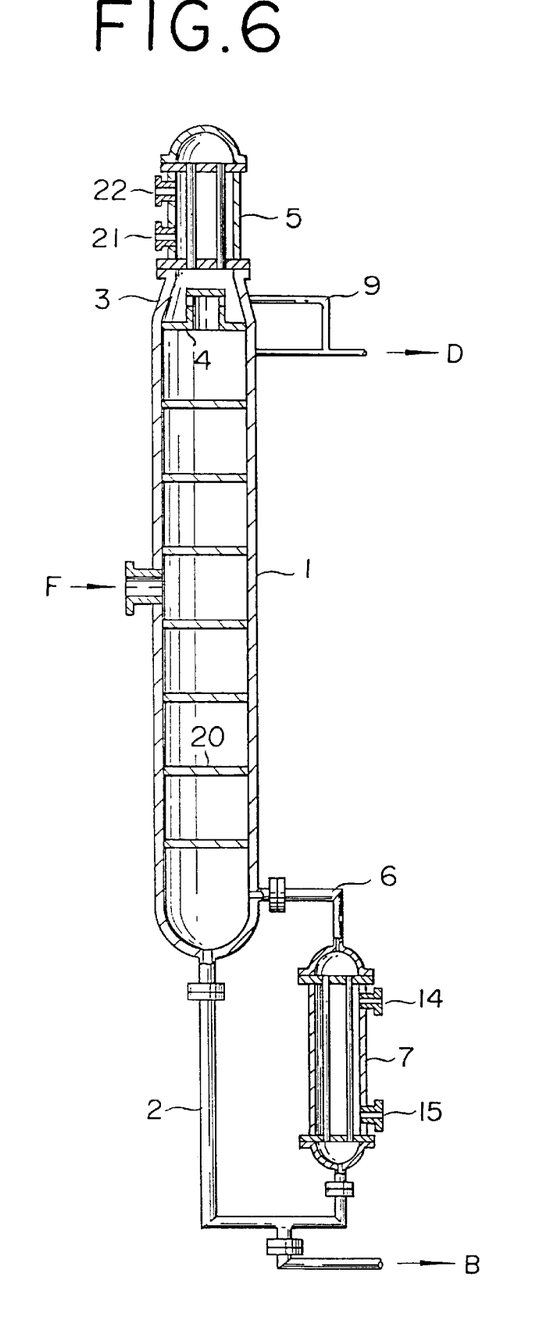
FIG. 6 is a sectional view illustrating one example of the distillation column that is furnished with a condenser directly in the top part of the distillation column, with a re-boiler in the lower part thereof and used in this invention.

FIG. 6 is a sectional view of a distillation column such in construction that a condenser is directly disposed in the top of the distillation column and a re-boiler is attached to the lateral lower part of the distillation column, both condenser and re-boiler having a plurality of tubes therein. Here, the condenser and the distillation column are not particularly limited but may use well-known devices such as a vertical heat exchanger and a plate column. The connection of the distillation column and the condenser can be attained by well-known methods such as welding or bolt-and-nut fastening through flanges. In the present diagram, like members or parts found in FIG. 1 are represented by like reference numerals. With reference to FIG. 6, The vertical shell-and-tube heat exchanger 5 is directly disposed in the top part 3 of the distillation column 1. The easily polymerizable matter-containing substance F such as (meth)acrylic acid containing impurities is supplied to the distillation column 1 and subjected therein to distillation of (meth)acrylic acid. In the distillation column 1, the vapor of the easily polymerizable matter such as (meth)acrylic acid enters the condenser 5. The vapor of the easily polymerizable matter that has entered into the condenser 5 is condensed as indirectly cooled with a well-known coolant such as water or a cooling liquid. The liquid resulting from the condensation is received in a pan 4 disposed in the upper part of the distillation column 1, recovered as a reflux liquid R in the distillation column 1, and further processed as occasion demands (D). A plate with a plurality of fine holes may be provided between the pan 4 and the condenser 5 in order to avoid the liquid condensed to directly enter the column 1 through the opening of the pan 4. The plate may be provided among the inner walls but provided in order to only cover the opening of the pan 4. Since the condenser 5 is directly disposed in the top part 3 of the distillation column 1 and the linear velocity of the vapor is set at a level of not less than 5 m per second and the retention time at a level of not more than 3 second as required, the polymerization of the vapor of the easily polymerizable matter such as (meth)acrylic acid between the distillation column and the condenser 5 can be allayed.

Further, the re-boiler 7 is disposed in the lower lateral part of the distillation column 1 using a (inter)connecting line. Here, the re-boiler is not particularly limited but may use any of the devices well known to the art. The vapor phase volume of the connecting line 6 is decreased to the fullest possible extent by minimizing the distance between the outlet of the re-boiler 7 and the inlet of the distillation column 1. For this purpose, the outlet of the re-boiler 7 is connected to the straight shell near the bottom of the distillation column 1 (FIG. 6 omits illustrating a support for fastening the re-boiler to the distillation column). Though the connecting member or pipe is not particularly limited on account of shape (such factors as radius of curvature, angle of bend, and angle of diversion), it is preferred to shorten the distance of connection with a view to heightening the effect. To be specific, it is proper to connect the distillation column 1 and the condenser 5 with a 90° bend/elbow joint or a short pipe/reducer. The connection of the connecting line 6 to the distillation column 1 or to the re-boiler 7 can be effected by such well-known methods as welding or bolt-and-nut fastening through flanges. The liquid of the easily polymerizable matter such as (meth)acrylic acid in the bottom part of the distillation column 1 passes through the connecting line 2 and enters the re-boiler 7. The vapor of the liquid formed by re-boiling in the re-boiler 7 passes through the connecting line 6 and enters the vapor phase part of the distillation column 1. In the connecting line 6, the polymerization of the vapor is prevented or allayed because the linear velocity of the vapor is set at a level of not less than 5 m per second and the retention time thereof at a level of not more than 3 seconds. The bottom stream in the re-boiler 7 is discharged via the connecting line 2(B).

In addition, reference numeral 20 is a plate with a plurality of fine holes, reference numeral 14 an inlet of a heat medium, reference numeral 15 an outlet thereof, reference numeral 21 an inlet of a coolant such as water, and reference numeral 22 an outlet thereof.

Figure 7:
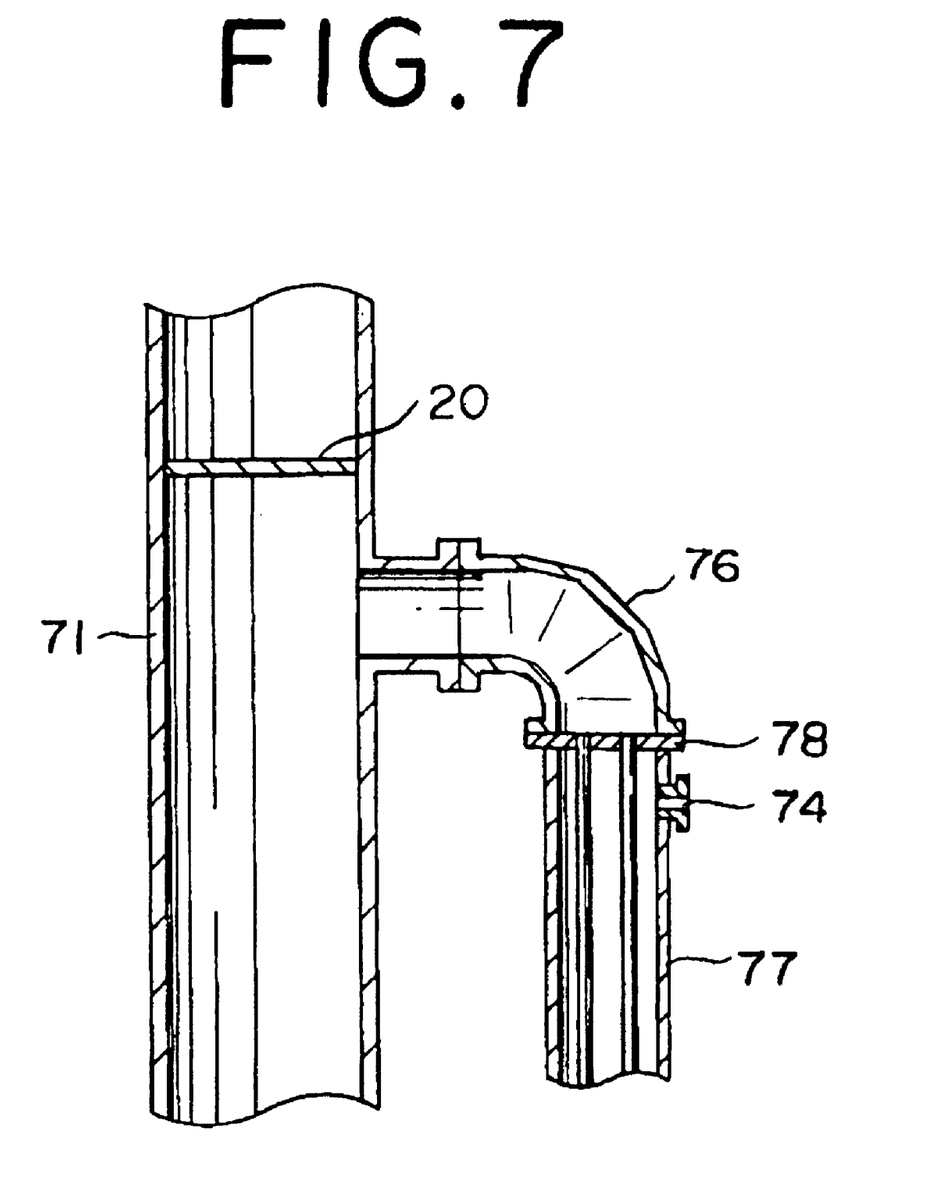
FIG. 7 is a fragmentary sectional view of another embodiment of parts of FIG. 6 showing a (inter)connecting line between the distillation column and the re-boiler.

FIG. 7 is a fragmentary sectional view of another embodiment of a (inter)connecting line between the distillation column and the re-boiler in FIG. 6. In FIG. 7, a (inter) connecting line 76 such as a miter bend is equipped between the distillation column 71 with the plate 20 and the re-boiler 77 with an inlet 74 of a heat medium by means of bolt-and-nut fastening through flanges. The inner diameter of the connecting line 76 is substantially identical to that of shell of the re-boiler 77 from the column 71 to the tube sheet 78 of the re-boiler 77 in the view point of good distribution of the vapor and preventing the channeling thereof.

The polymerization of the easily polymerizable matter-containing substance such as (meth)acrylic acid in the connecting line can be effectively prevented as described above. In a similar manner as above, the polymerization of (meth)acrylic acid ester can be effectively prevented.

The case of having a condenser disposed in the straight shell of the upper part of a distillation column and a re-boiler disposed in the straight shell of the lower part inside the distillation column, the case of having a condenser disposed in the straight shell of the upper part of a distillation column and a re-boiler disposed directly in the lower part of the distillation column, and the case of having a condenser disposed directly in the top of a distillation column and a re-boiler disposed in the straight shell of the lower part of the distillation column have been illustrated. This invention does not need to be limited to these cases. The condensers and the re-boilers may be used either singly or in an arbitrary combination.

By the construction described above, it is possible to reduce the distance of passage of the vapor between the distillation column and the heat exchanger substantially to zero or to set the linear velocity of the vapor in the connecting line intervening between the distillation column and the heat exchanger at a level of not less than 5 m per second and the retention time thereof at a level of not more than 3 seconds. Thus, even when the distillation of a liquid mixture containing acrylic acid, acetic acid, propionic acid, acrolein, maleic acid and/or formalin is continued for a long time, virtually no sign of the adhesion of a polymer to the part of the connecting line exposed to the liquid mixture due to the effect of the retention time is recognized.

EXAMPLES

Now, this invention will be described more specifically below with reference to examples. However, this invention is not limited by the following examples.

Example 1

Acrylic acid was refined by the use of a distillation column measuring 1100 mm in inside diameter and having 50 sieve trays of stainless steel (SUS316) built therein. The distillation was performed continuously for one week by feeding a feed liquid composed of 98 wt. % of acrylic acid and 2 wt. % of acetic acid under the conditions of 53.3 hpa-abs (40 mmHg) of column top pressure, 63° C. of column top temperature, 120 hpa-abs (90 mmHg) of column bottom pressure, 84° C. of column bottom temperature, and 7 of reflux ratio. (At the end of the continuous operation, the acrylic acid in the bottom had an assay of 99.95%.) A condenser (vertical shell-and-tube heat exchanger) was connected to the distillation column by means of a vapor line and supported to the column by means of a structure (not shown) in the straight shell near the top of the distillation column and a flanged connecting pipe. In this case, the linear velocity of the vapor in the vapor line was 20 m/s and the retention time thereof was 0.1 second. (The retention time was determined by the formula mentioned above; Retention time=$G/(H \times I)$=2.1/(20×1.1)=0.1.) The pressure loss between the top of the column to the condenser was constant during the course of distillation. When the distillation column was opened and the interior thereof was visually inspected, the surfaces of tubes from the top of the column through the condenser showed no sign of adhesion of a polymer.

Further, a re-boiler was connected to the distillation column by means of a vapor line and supported to the column by means of a structure (not shown) in the straight shell near the bottom part of the column and a flanged connecting pipe. Here, the vapor line opened into the vapor phase part of the distillation column. In the vapor line, the linear velocity of the vapor was about 40 m/s and the retention time thereof was 0.1 second ($G/(H \times I)$=1.2/(40×0.3)=0.1). When the column was opened and the interior thereof was visually examined, the vapor line of the re-boiler showed no sign of adhesion of a polymer.

Comparative Example 1

The distillation was carried out by following the procedure of Example 1 while extracting the column top vapor through the top of the column and using the condenser mounted on a structure (retention time of the column top vapor 3.5 seconds) and the re-boiler set on a structure (retention time of the vapor 3.2 seconds). (These retention times were determined by the formula mentioned above; Retention time in condenser=$G/(H \times I)$=77/(20×1.1)=3.5 and retention time in re-boiler=38 /(40×0.3)=3.2.).

During the course of the distillation, the pressure loss from the column top through the condenser reached 2 mmHg in one week. When the column was opened after the stop of the operation and the interior thereof was visually examined, the occurrence of about 100 liters of polymer in the connecting pipe from the column top to the tube sheet of the condenser was confirmed. In the bottom of the column, no sign of rise of pressure loss was recognized. When the column was opened and the interior was visually examined, the occurrence of about 130 liters of polymer on the vapor line of the re-boiler was confirmed.

Example 2

(Case of Having a Re-boiler Disposed Directly in the Lower Part Inside a Distillation Column)

Acrylic acid was refined by the use of a distillation column measuring 1400 mm in inside diameter and having 10 sieve trays of stainless steel built therein. The distillation was performed continuously for three weeks by feeding a feed liquid composed of 99% of acrylic acid and 1% of impurities including the dimer or acrylic acid under the conditions of 46.7 hpa-abs (35 mmHg) of column top pressure, 63° C. of column top temperature, and 0.3 of reflux ratio. (At the end of the operation, the acrylic acid at the top thereof had an assay of above 99.95%).

A re-boiler was a natural circulation type one provided with a down-take outside the heating tubes and further furnished with a vapor guide opening into the vapor phase part of the column and disposed directly in the distillation column. When the column was opened and the interior thereof was visually examined, no sign of adhesion of a polymer was recognized.

Example 3
(Case of Having a Condenser Directly Disposed in the Top of a Distillation Column)

The distillation was carried out by following the procedure of Example 1 while having a condenser disposed in the top of a distillation column through flanges. The distillation was continued for two weeks. (At the end of the operation, acrylic acid at the bottom thereof had an assay of 99.95%). When the column was opened and the interior thereof was visually examined, the top of the column and the condenser showed no sign of adhesion of a polymer.

Example 4

2-Ethylhexyl acrylate was refined by the use of a distillation column measuring 1200 mm in inside diameter and having 20 sieve trays of stainless steel built therein.

The distillation was performed continuously for three weeks by feeding a feed liquid composed of 98.5 wt. % of 2-ethylhexyl acrylate and 1.5 wt. % of an impurity having a high boiling point under the conditions of 26.7 hpa-abs (20 mmHg) of column top pressure, 107° C. of column top temperature, and 0.4 of reflux ratio. A condenser (vertical shell-and-tube heat exchanger) was connected to the distillation column by means of a vapor line and supported to the column by means of a structure (not shown), the inner diameter thereof was identical to that of the condenser, in the straight shell near the top of the distillation column and a flanged connecting pipe. In this case, the linear velocity of the vapor in the vapor line was 22 m/s and the retention time thereof was 0.09 second. (The retention time was determined by the formula mentioned above; Retention time=G/(H×I)=0.39/(22×0.2)=0.09.) The pressure loss between the top of the column to the condenser was constant during the course of distillation. When the distillation column was opened and the interior thereof was visually inspected, the surfaces of tubes from the top of the column through the condenser showed no sign of adhesion of a polymer.

Further, a re-boiler was connected to the distillation column by means of a vapor line and supported to the column by means of a structure (not shown) in the straight shell near the bottom part of the column and a flanged connecting pipe in which the inner diameter of the vapor line was identical to that of the re-boiler. Here, the vapor line opened into the vapor phase part of the distillation column. In the vapor line, the linear velocity of the vapor was about 11 m/s and the retention time thereof was 0.06 second (G/(H×I)=0.11/(11×0.16)=0.06). When the column was opened and the interior thereof was visually examined, the vapor line of the re-boiler showed no sign of adhesion of a polymer.

The entire disclosure of Japanese Patent Application No. 11-97893 filed on Apr. 5, 1999 including specification, claims, drawings and summary are incorporated herein by reference in its entirety.

What is claimed is:

1. An apparatus for refining an easily polymerizable matter-containing substance comprising:

a distillation column, and a heat exchanger disposed directly in a lower part inside the distillation column, the heat exchanger comprising a cylindrical vessel provided on the lateral side thereof with an inlet and an outlet for a heating medium and tightly sealed in the upper and lower part thereof, a plurality of heat transfer tubes disposed between the upper and lower sides of the cylindrical vessel and provided respectively therein with a vertically piercing hole, a vapor guide disposed above the cylindrical vessel and having a vapor vent positioned approximately in the central part of the distillation column, a loose lid disposed on or above the vapor vent, and a down-take disposed in such a manner outside the heating tubes as to join the upper and lower parts of the cylindrical vessel, wherein the heat exchanger serves as a re-boiler.

2. An apparatus according to claim 1 further comprising a condenser, wherein an interconnecting line for a vapor connected to the condenser is connected to an upper straight shell of the distillation column.

* * * * *